United States Patent [19]

Hill

[11] Patent Number: 5,040,185
[45] Date of Patent: Aug. 13, 1991

[54] LARGE VOLUME GASEOUS ELECTRIC DISCHARGE SYSTEM

[76] Inventor: Alan E. Hill, Box 5444-A, Rte. 5, Albuquerque, N. Mex. 87123

[21] Appl. No.: 287,538

[22] Filed: Dec. 19, 1988

Related U.S. Application Data

[63] Continuation-in-part of Ser. No. 830,449, Feb. 18, 1986, abandoned.

[51] Int. Cl.$^5$ ............................ H01S 3/00; H05B 37/00
[52] U.S. Cl. .......................................... 372/38; 372/25; 372/85; 315/160
[58] Field of Search ............... 315/160, 166, 318, 349, 315/172, 302; 372/9, 18, 25, 33, 38, 81, 83, 85

[56] References Cited

U.S. PATENT DOCUMENTS 3,178,657  4/1965  Morse ..................................... 372/25
3,532,930  10/1970  Lock ...................................... 372/38
4,071,806  1/1978  List ........................................ 372/85

Primary Examiner—William L. Sikes
Assistant Examiner—Georgia Y. Epps
Attorney, Agent, or Firm—Donald P. Smith

[57] ABSTRACT

A control circuit for a laser system having a first and second power supply connected in parallel. A mode selector is available to the laser operator to change the operational mode of the laser system from continuous to pulse mode or vice versa, and any combination of the modes. In the pulse mode, a series of short-time voltage pulses is superimposed on a low power level laser mode by using the circuit control characteristic of the thyratron tube and shunting the ballast resistors to sharply increase the laser output power for the duration of the individual pulses.

9 Claims, 1 Drawing Sheet

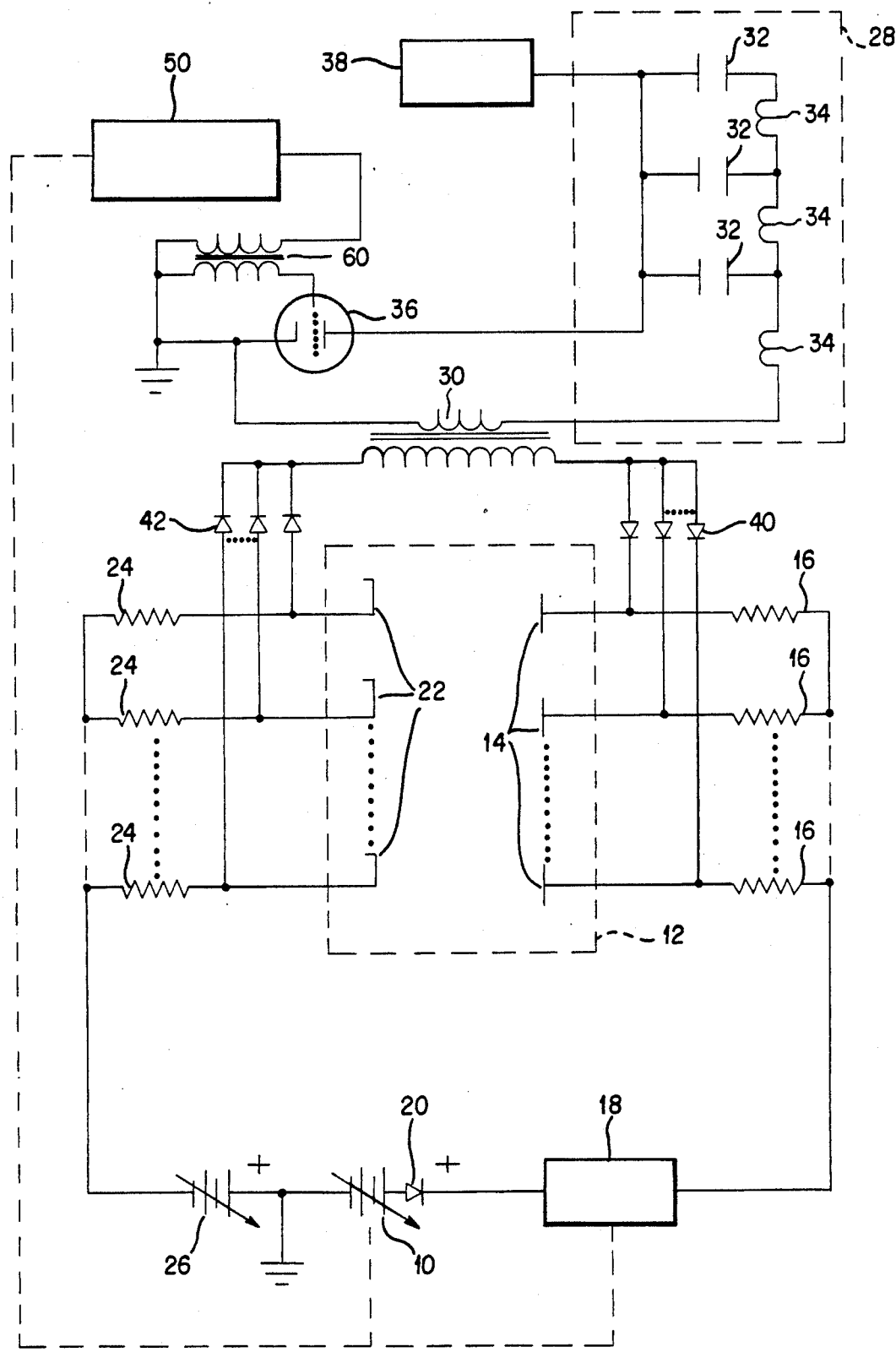

LARGE VOLUME GASEOUS ELECTRIC DISCHARGE SYSTEM

BACKGROUND OF THE INVENTION

This application is a continuation-in-part of my application Ser. No. 06/830,449 filed Feb. 18, 1986 now abandoned.

FIELD OF THE INVENTION

One of the problems encountered when a laser system is designed and intended for use in an industrial environment is the compactness, size and reliability of system. Lasing action in a system is obtained by subjecting a gas-filled vessel or channel to an electric discharge; the electrons provided by the discharge collide with active gas molecules thereby exciting them to higher energy levels, from which they descend to lower energy levels and emit excess energy in the form of photons, or light quanta. The population density of particles in the higher energy level must exceed that in the lower energy level to achieve optical gain. This population inversion is the opposite of the natural state.

A discharge, normally, has a very thin diameter because the heat transfer rates in different parts of the discharge are not uniform, and this results in lower density at the inside of the plasma column, thereby increasing the ionization rate at the center, and constricting the column.

My patent Ser. No. 4,849,984 which is hereby incorporated by reference shows an electrical discharge having a large cross sectional area which will uniformly fill large volume cavities, regardless of size or shape, to provide reliable lasers suitable for industrial applications.

As more fully explained and described in the patent, above identified, the lasing gas in the channel is an homogenous blend of a plurality of a gas streams; and aerodynamic forces are depended upon to develop turbulence (or vortices) as a result of gas molecule collisions and yielding homogenous longitudinal channel flow with a uniform radial velocity distribution and volumetrically uniform plasma density.

DESCRIPTION OF THE PRIOR ART

Lasers are now used to sharply reduce production costs in those industrial applications requiring cutting, welding, drilling, heat treating and the like. However, according to industry publications, laser sales are only about three percent of the machine tool industry. The use of my invention with a laser will be most useful in such industrial applications as well as the rapid removal of paint, scale, rust or other unwanted coatings which must be removed from materials or vehicles such as ships.

SUMMARY OF THE INVENTION

The embodiment of my co-pending patent application identified above, relates to a high power laser, but this invention encompasses a circuit to gate the operation of the laser to change its operation from continuous to intermittent, or pulse, or vice versa, or any combination thereof. The pulse operation is useful in an industrial environment performing duty as cleaning, paint removal, rust removal and the like.

It is well known in the laser art that the volt ampere characteristic of the discharge between electrodes is negative and that a series connected reactance element (ballast) is necessary for circuit stability. This is illustrated in the prior art patent of record, to Lock Ser. No. 3,532,930 issued Oct. 6, 1970 in column 4 lines 21-32 wherein several series connected ballast resistors are depended upon to create a net positive load resistance. While a ballast resistor is necessary in the steady state or continuous laser operation, to prevent an out-of-control arc, the ballast has a less then desirable characteristic when a laser is to be operated in the pulse mode, because the ballast sharply reduces the voltage build-up response to be applied, thereby limiting the amplitude of the pulses available. The elimination of the ballast is necessary in order to produce a very high level pulse energy output.

It is accordingly a broad object of the invention to provide a control circuit for a laser.

It is another object of the invention to provide a control circuit for a laser which will selectively change the operation from continuous mode to pulse mode or vice versa.

It is yet another object of the invention to provide a laser control circuit which will selectively connect parallel power supplies to a laser to switch from one operating mode to another or to combine the operating modes.

It is yet still another object of the invention to provide a laser pulse circuit which superimposes a series of short-time duration current pulses onto a low but uniformally distributed plasma to provide high power laser pulses.

It is a further object of the invention to provide a laser control circuit wherein ballast circuit elements are connected to the laser terminals in the steady state operating mode and are shunted from the circuit in the pulse operating mode.

It is a yet further object of the invention to provide a method for operating a laser which comprises the and applying the series of pulses directly to the laser electrodes to produce an output series of pulses of coherent light.

It is a yet still further object of the invention to provide a method for operating a laser and for switching from one operating mode to another which comprises the steps of applying a steady state voltage through ballast resistors to the laser electrodes, and selectively generating a series of pulses of electrical energy and applying the series of pulses directly to the laser electrodes to produce an output series of pulses of coherent light many times the magnitude of the steady state output.

BRIEF DESCRIPTION OF THE DRAWING

The single figure shows a schematic circuit for the control of a laser system including a mode selector, whereby the laser operator can selectively operate the laser in the continuous mode or the pulse mode or any combination. A second power supply is connected in parallel with a first power supply to superimpose a series of short-time duration current pulses onto a relatively low level DC voltage applied to the laser discharge which results in a short-time duration repetitive peak power laser output pulse many times greater than the normal continuous power output. The first power supply is infinitely variable so the pulse power may be superimposed upon continuous power.

DETAILED DESCRIPTION OF THE INVENTION

Referring now to the drawing wherein reference character 10 indicates a first power supply for multi-electrode laser 12, as shown schematically. A plurality of laser anodes 14 are connected through ballast resistors 16, current regulator 18, and pulse blocking diode 20 to the positive terminal of variable voltage power supply 10. A plurality of cathodes 22 are connected through ballast resistors 24 to the negative terminal of the power supply to provide circuit stability, as discussed above. The positive terminal of auxiliary power supply 26 is connected to the negative terminal of power supply 10 and to ground. The purpose of power supply 26 is to insure that the cathodes 22 float negative with respect to ground to avoid backstreaming. This completes the first power supply.

A second power supply is connected in parallel with the above described first power supply and comprises a pulse forming network shown generally as reference character 28 connected to the primary of step-up transformer 30. The pulse forming circuit comprises a plurality of parallel connected capacitors 32 and series connected inductance coils 34 connected between thyratron switch 36 and resonant charging system 38. The secondary of transformer 30 is connected at one end through blocking diodes 40 to the laser anodes 14 and at its other end through blocking diodes 42 to the laser cathodes 22 to complete the circuit. A laser operation mode selector, shown generally as referenced character 50, is connected mechanically or electrically to control the infinitely variable voltage first power supply 10 which is symbolically represented by the arrow appearing thereon. The selector is electrically connected through trigger transformer 60 to the grid of thyratron 36 for a purpose that will later be explained.

OPERATION

In the operation of the circuit to change the laser from continuous phase to pulse phase, the mode selector is actuated by the laser operator to reduce the voltage output of first power supply 10 to a low level sufficient to maintain ionization in the laser at about the voltage glow state, and a voltage pulse is applied to the grid of thyratron 36 through transformer 60. In the actual reduction to practice of the system, the operating characteristics of the thyratron tube was found useful in one mode to control the high energy short-time duration pulse needed.

When the thyratron 36 is fired by the voltage pulse to its control grid from mode selector 50, the pulse forming network 28 having been charged from resonant changing system 38 generates a square wave output pulse which is applied to the primary of transformer 30. The secondary of transformer 30 superimposes the short-time high voltage pulse on the before mentioned low level DC voltage existing across the electrodes of laser 12 thus sharply increasing its output peak beam power. Ballast resistors 16 are thus shunted in this circuit and the electrodes 22 and 14 receive the full benefit of the sharply increased voltage. It has been found that when this circuit is used to control a laser of the type having the homogenous plasma gas flow described above a pulse amplitude of 300 to 1 is attained.

Stated differently, when the laser's plasma is controlled or adjusted to operate at a low power level sufficient to maintain ionization at the voltage glow state and wherein the ion density is high enough to support conduction, the system can be gated by superimposing a short-time duration current pulse directly onto the low level voltage thus increasing the output power many times over the average value for the duration of the pulse. The high current state does not develop instabilities in the discharge because the homogenous plasma flow prevents the formation of an out of control arc. Thus, the negative volt ampere characteristic of the discharge when operating on the homogenous plasma flow yields extremely high amplitude power pulses. For example, a 5 KW maximum continuous wave laser operated in this manner yields from zero to 5 KW average power; however, the peak power is many times greater than the above-mentioned continuous power. The pulse width, as an example, can be about 3 microseconds at 1000 pulses per second (1000 PPS) yielding a peak power of perhaps 300 times the continuous power level.

Pulse forming network 28 having discharged itself through transformer 30, the grid of thyratron 36 now regains control and the pulse dies. Adroit design of circuit parameters permits a pulse repetition rate as a function of pulse forming circuit charging time and thyratron grid pulse-application rate.

Since voltage supply 10 is infinitely variable, any combination of operational modes is available at the selection of the operator. Thus, pulse power can be superimposed upon continuous power to perform any given industrial operation.

An alternative and perhaps preferable species of the circuit has been developed (not shown) wherein the output of pulse forming network 28 is connected directly to the blocking diodes thereby eliminating the thyratron control and its associated elements. The ballast resistors are again shunted by this circuit connection.

Another switching means is revealed in my patent Ser. No. 4,442,383 issued Apr. 10, 1984 and entitled "Plasma Switch" which is incorporated herein by reference.

It will be seen that I have provided a laser control circuit which greatly increases the flexibility and usefulness of a high power laser. It will be apparent to those skilled in the art that many changes may be made in the construction and arrangement of parts without necessarily departing from the scope of the invention as defined in the claims.

I claim:

1. A circuit to control the operation of a laser having at least one pair of electrodes and to selectively convert laser operation from one operational mode to another comprising in combination:
   (a) a laser first power supply circuit having means to vary the output voltage connected to the laser electrodes through ballast resistors to maintain circuit stability.
   (b) a laser second power supply circuit connected in parallel with said first power supply circuit and directly to the laser electrodes, and
   (c) a mode selector connected to said first power supply circuit and to the second power supply circuit to simultaneously reduce the first power supply output voltage to a level which sustains plasma ionization in the glow state, to shunt the ballast resistors, and to impress a short-time high voltage pulse on the laser electrodes to sharply increase the plasma current, resulting in a short burst of output beam power.

2. The invention according to claim 1 wherein the laser electrical discharge is made homogenous and stabilized by a blend of a plurality of gas streams and by vortices and uniform radial velocity distribution.

3. The invention according to claim 1 including a plurality of blocking diodes connected between the said first power supply circuit and said second power supply circuit to prevent voltage feedback between the two circuits.

4. The invention according to claim 2 wherein the said laser second power supply circuit includes a pulse forming network connected between a charging system and a switching means whereby actuation thereof yields repeated high voltage laser output pulses.

5. The invention according to claim 4 wherein the laser output pulses are superimposed on laser continuous power output.

6. The invention according to claim 4 wherein said switching means comprises a plasma switch.

7. A method for operating a laser and for switching from one operating mode to another which comprises the steps of:
(a) applying a steady state voltage through ballast resistors to the laser electrodes to produce a first laser output,
(b) generating a series of pulses of electrical energy and
(c) actuating a mode selector which applies the series of pulses to the laser electrodes by bypassing the ballast resistors to produce an output series of coherent light many times the magnitude of the first laser output.

8. The combination of a gas discharge laser and a circuit to control and to change its operation from one operating mode to another operating mode and to superimpose pulse - power voltage supply upon continuous - power voltage supply to the laser comprising:
(a) a first power supply circuit having means to vary the voltage supplied to the laser through ballast resistors,
(b) a second power supply circuit connected in parallel with said first power supply circuit to apply pulse voltage directly to the laser,
(c) a mode selector circuit connected to said first and second power supply circuits to apply a series of high voltage pulses to said laser by bypassing the said ballast resistors whereby pulse voltage is superimposed on continuous voltage to provide a short burst of output beam power.

9. The combination of claim 8 wherein the laser discharge is homogeneous as a result of a blending of gas streams and by vortices and uniform radial velocity distribution.

* * * * *